United States Patent [19]

Sinclair et al.

[11] Patent Number: 5,766,016

[45] Date of Patent: Jun. 16, 1998

[54] SURGICAL SIMULATOR AND METHOD FOR SIMULATING SURGICAL PROCEDURE

[75] Inventors: Michael J. Sinclair; John W. Peifer, both of Atlanta, Ga.

[73] Assignee: Georgia Tech Research Corporation, Atlanta, Ga.

[21] Appl. No.: 337,869

[22] Filed: Nov. 14, 1994

[51] Int. Cl.$^6$ .................................................. G09B 23/28
[52] U.S. Cl. ..................... 434/262; 434/271; 434/307 R; 434/365; 395/173; 348/78; 340/407.1; 364/578; 128/774
[58] Field of Search ..................................... 434/118, 256, 434/262, 270, 271, 307 R, 308, 309, 365; 273/148 B, 440, 454, DIG. 28; 395/95, 127, 152, 154, 155, 761, 806, 807, 173, 174, 326; 364/578, 413.01, 413.13, 413.22; 348/42, 44, 61, 78; 128/662.06, 774; 340/407.1

[56] References Cited

U.S. PATENT DOCUMENTS

| | | |
|---|---|---|
| 4,321,047 | 3/1982 | Landis . |
| 4,854,876 | 8/1989 | Heath et al. . |
| 4,907,973 | 3/1990 | Hon .......................................... 434/262 |
| 5,049,147 | 9/1991 | Danon . |
| 5,149,270 | 9/1992 | McKeown . |
| 5,320,538 | 6/1994 | Baum ...................................... 434/43 X |
| 5,345,940 | 9/1994 | Seward et al. ........................ 128/662.06 |
| 5,446,834 | 8/1995 | Deering .................................. 395/127 |
| 5,451,924 | 9/1995 | Massimino et al. ................... 340/407.1 |
| 5,454,722 | 10/1995 | Holland et al. .......................... 434/271 |

OTHER PUBLICATIONS

"Virtual Environment Display System" by Fisher et al, ACM 1986 Workshop on Interavtive 3D Graphics, pp. 1–11, Oct. 1986.

Toon, J., "Virtual Reality for Eye Surgery," Georgia Tech Research News, Nov. 12, 1993.

Nataloni, R., "Ophtalmologists Enjoy Simulating Experience", Ocular Surgery News, Jan. 15, 1994, p. 13.

Adam, J. "Medical Electronics", IEEE Spectrum, Jan. 1994, pp. 70–73.

Carroll, L., "Virtual Reality Shapes Surgeons'Skills," Medical World News, Feb. 1994, pp. 26–27.

Lempert P., M.D. "AAO '93 Exhibits: What's New in Computers" Opthalmology Times, Jan. 15, 1994, pp. 17–18.

Husted, B., "The Eyes Have it in New Program," The Atlanta Journal-Constitution, Dec. 2, 1993, p. G2.

"Simulator for Eye Surgery," R&D Magazine, Feb. 1994, p. 146.

"Virtual Reality with The Eye Surgery Simulator" Eyecare Technology, Jan.–Feb. 1994, p. 85.

McCarthy, P., "Eye Contact", Wired, Apr. 1994, P. 26.

Kotulak, R. and Van, J., "Heal Thyself", Chicago Tribune Jan. 2, 1994, Section 5.

(List continued on next page.)

Primary Examiner—Joe Cheng
Attorney, Agent, or Firm—Thomas, Kayden, Horstemeyer & Risley, L.L.P.

[57] ABSTRACT

A surgical simulator provides both visual and tactile feedback in order to realistically portray an actual surgical procedure. The visual feedback is provided through an SGI graphics computer which drives a monitor to display two images of an eye at slightly different perspectives. A set of optics, which preferably mimics an actual surgical microscope, combines the two images to form a stereo image of the eye. An instrument for simulating a surgical tool is connected through three sets of levers and hinges to three servo-motors which collectively generate a resistive force along any direction. The forces provided to the instrument are modeled after forces measured during an actual procedure and therefore accurately simulate the feel of a surgical procedure. The position and orientation of the instrument is transmitted to the SGI graphics computer which manipulates the eye based upon the position and motion of the instrument and updates the image of the eye to display a manipulated eye. The position of the instrument is also relayed to a second processing unit which provides the tactile feedback based upon the state of the instrument.

27 Claims, 9 Drawing Sheets

OTHER PUBLICATIONS

Toon, J., "Eye Surgery Simulator Could Help Physicians Practice New Techniques," The Electron, Feb. 1994.

Sussman, G., "Surgery By Virtual Reality", U.S. Tech, Dec. 1993.

O'Neill, B., "Putting Virtual Reality To Work: Eye Surgery Simulator Could Help Physicians Learn and Practice New Techniques," Simulation, Dec. 1993, p. 117.

Jackson, W., "Eye Simulator Helps Train Ophthalmologists," The Medical Herald, Jan. 1994, p. 7.

"Professional Healthcare Market Bearing Fruit", Multimedia Week, Dec. 6, 1993.

"Computer Simulates Real Eye", Your Health, Mar. 22, 1994.

"Prototype System Uses Virtual Reality to Simulate Eye Surgery," Biomedical Technology Information Service, Mar. 1, 1994.

"Surgery Simulator", Science and Children, Feb. 1994, p. 8.

"Surgery Simulator Prototype Being Developed," The Kansas City Star, Jan. 16, 1994.

SURGICAL SIMULATOR AND METHOD FOR SIMULATING SURGICAL PROCEDURE

FIELD OF INVENTION

This invention generally relates to an apparatus for simulating a surgical procedure and, more particularly, to an ocular surgical simulator.

BACKGROUND OF THE INVENTION

In general, an intern's specific training for a surgical procedure or for responding to a complication arising during surgery has been limited to medical textbooks, research, observation of others, and practice. With regard to the type of practice available, an intern typically first performs a procedure on human cadavers or on animals, both of which do not accurately portray the actual procedure on a patient. When an intern performs a surgical procedure for the first time on an actual patient, the intern is under the close supervision of an experienced surgeon.

As a result of the inherently limited amount of practical experience an intern can obtain prior to performing a procedure on a patient, an intern may have insufficient training to know the optimal manner in which to perform an operation or in which to respond to a particular complication. An intern's ability to gain practical experience is particularly difficult for infrequently performed procedures or for complications that rarely occur. Unfortunately, this limited amount of experience could mean the difference between success or failure in some surgical procedures It is therefore crucial that an intern obtain as much practice as possible before performing the procedure for the first time on a patient.

It is also crucial that physicians be able to maintain their skills or acquire new skills outside the surgery room. While a physician may have been fully qualified to perform a certain procedure, the lapse of time or the evolution of new technology may render the physician ill-trained for the procedure. Moreover, even if the physician has been trained for a new procedure, the period of training is very short and does not fully prepare a physician for the procedure. Thus, there is also a need for physicians to be able to acquire practice outside the operating room.

In other professions, such as with airline pilots, simulators have been developed to approximate real-life situations. For a commercial airline pilot, computer driven flight simulators have been designed to give the pilot an interactive, real-time experience that realistically depicts flying and which further simulates emergency events. The commercial pilot can therefore perfect skills necessary for flying the aircraft and can also train for emergency events in the safety of the simulator.

Another type of simulator has been specially designed for the setting of an aircraft carrier. U.S. Pat. No. 4,854,876 to Heath et al., for example, discloses an aircraft carrier simulator that moves a deck to simulate the motion of an aircraft carrier in an ocean. The various crews on the aircraft carrier, such as the fire, crash, battle station, and flight mechanics crews can all acquire realistic deck training before they are sent to an aircraft carrier In the medical field, on the other hand, simulators have been designed to simulate only a few aspects of a surgical procedure. For instance, U.S. Pat. No. 4,321,047 discloses an apparatus for helping interns learn surgical knot tying techniques on simulated human vessels and ducts. The intern loops a piece of surgical thread around a flexible tube and tightens the loop, thereby moving a set of spring wires in the tube. A detecting device is connected to the spring wires and generates various kinds of feedback signals to the intern based on the positioning of the wires.

With another type of simulator, disclosed in U.S. Pat. No. 5,149,270 to McKeown, an intern can practice endoscopic procedures within a cavity closeable to outside view but containing an object simulating a human organ. An intern can therefore learn to manipulate and use instrumentation and can develop the manual dexterity required for real-life operating and diagnostic conditions.

Rather than providing an intern with some practice, an apparatus disclosed in U.S. Pat. No. 5,049,147 to Danonfor aids a surgeon during laser surgery. The apparatus displays an image of the surgical area and estimates the effects of an operator indicated laser surgical procedure before performing the procedure. After displaying the simulated effects of the procedure, the surgeon can elect to have the apparatus automatically perform the operator indicated procedure. Although this apparatus can assist a surgeon during a surgery, a surgeon cannot practice a surgical procedure outside of the operating room.

While the above-described apparatuses are useful since they give an intern or a physician the opportunity to practice some aspects of a surgical procedure or provide assistance during a surgery, the simulators do not allow an intern or physician the ability to practice a surgical procedure. Moreover, the simulators in the medical field do not realistically and accurately simulate a human patient. Because an intern cannot practice an entire procedure in a realistic setting, an intern cannot be completely prepared for a particular procedure before performing the procedure for the first time.

Thus, there is a need in the medical field for a surgical simulator that provides interns as well as physicians the opportunity to practice surgical techniques. There is also a need in the medical field for a simulator that realistically simulates a surgical procedure.

It was also difficult in the medical field to objectively evaluate the surgical performance of an intern or a physician. An intern is allowed to perform a technique for the first time under the supervision of a surgeon when that surgeon subjectively believes that the intern is fully capable. While the intern may be able to practice on a human cadaver, it was difficult to evaluate the intern's practice performance since the cadaver only approximated the responses of an actual patient. Moreover, the objective evaluation is limited by the amount that can be visually observed and documented.

One manner in which a practice performance would be documented is by simply video taping the performance. Since the video camera typically had the same approximate field of view as the intern, the replay of the tape, while helpful, would be unable to track various aspects of the procedure, such as the depth of incision or the angle of approach. A better method of documenting the performance of an intern involved slicing an eye in half and mounting the eye to a clear panel. The eye would be filled with a pressurized amount of fluid to resemble an actual eye and a camera would be mounted underneath the panel to video tape the performance of a procedure. In this manner, an intern's performance could be replayed and additional information could be obtained by observing the procedure from underneath the eye. The ability to record and replay the procedure from underneath the eye is therefore extremely beneficial in assessing the performance of the intern. This technique, however, does not realistically simulate an actual patient's eye and therefore is not an accurate assessment of the intern's performance.

SUMMARY OF THE INVENTION

It is a general object of the invention to overcome the disadvantages of the prior art surgical simulators, as noted above and as generally known in the art.

It is an object of the present invention to realistically simulate a surgical procedure and, more particularly, to simulate ocular surgery.

It is another object of the present invention to simulate a surgical procedure with real-time visual feedback.

It is a further object of the present invention to simulate a surgical procedure with visual feedback accurately portraying the images that would be obtained during an actual procedure.

It is yet another object of the present invention to simulate a surgical procedure with real-time tactile feedback.

It is yet a further object of the present invention to simulate a surgical procedure with tactile feedback accurately portraying the forces that would be felt during an actual procedure.

It is also an object of the present invention to replay a simulated surgical procedure from any angle of view.

It is an additional object of the present invention to objectively evaluate the performance of an intern or physician.

Additional objects, advantages and novel features of the invention are set forth in the description which follows, and will become readily apparent to those skilled in the art.

To achieve the foregoing and other objects, in accordance with the present invention, in a preferred embodiment thereof, a surgical simulator comprises a display for displaying a stereo image of a bodily area and an instrument for simulating a surgical tool. A position and orientation tracker generates positional signals indicating the position and orientation of the instrument to a processor. A tactile feedback assembly provides resistive forces to the instrument based upon a tactile command signal issued from the processor and based upon the position and orientation of the instrument. The processor receives the positional signals, manipulates the bodily area based upon the positional signals, transmits a stereo image of the manipulated bodily area to the display, and generates the tactile command signal to the tactile feedback assembly.

In a preferred embodiment, the surgical simulator provides stereo images of a model eye and a first processor generates the model eye and modifies the model of the eye according to the position and orientation of the instrument. The first processor also generates the tactile command signal to a second processor. The second processor controls an amount and direction of a resistive force applied to the instrument and varies the resistive force according to the tactile command signal and the position and orientation of the instrument. The model eye appears realistic and is modified to approximate a modification of an actual eye when the surgical tool is located at the particular position and orientation of the instrument. Also, the resistive forces approximate forces supplied to the surgical tool when the surgical tool is at the position and orientation within the actual eye. With the surgical simulator, a person can receive realistic visual and tactile feedback to simulate ocular surgery Another aspect of the invention relates to a method for simulating a surgical procedure. The method comprises the steps of developing a model of a bodily area, displaying the model of the bodily area, and then determining a position and orientation of an instrument simulating a surgical tool. Based upon the position and orientation of the instrument, resistive forces are provided to the instrument to reflect forces that would be applied to the surgical tool if the surgical tool were located at the position and orientation of the instrument but in an actual bodily area. The model of the bodily area is modified according to the position and orientation of the instrument to reflect effects of the surgical tool on the actual bodily area. The method then repeats itself by returning to the step of displaying the model of the bodily area.

The method preferably simulates ocular surgery and displays a model of an eye in stereo view. The model of the eye may be displayed from any angle of view, including directly behind the eye, and with various tissue layers removed. The model of the eye is produced by first photographing components of the eye, texture mapping the photographs, and then developing a mathematical model of the eye. The simulated surgical procedure may be recorded and replayed. The instrument used in the procedure is not limited to just a single surgical tool but may be assigned to any one of a plurality of different surgical tools. Based upon the surgical tool selected and the position and orientation of the instrument, the resistive force is classified into one of a plurality of different states.

BRIEF DESCRIPTION OF THE DRAWINGS

The accompanying drawings, which are incorporated in, and form a part of, the specification, illustrate a preferred embodiment of the present invention and, together with the description, serve to illustrate and explain the principles of the invention. The drawings are not necessarily to scale, emphasis instead being placed on clearly illustrating the principles of the invention. In the drawings.

DETAILED DESCRIPTION

Figure 1:
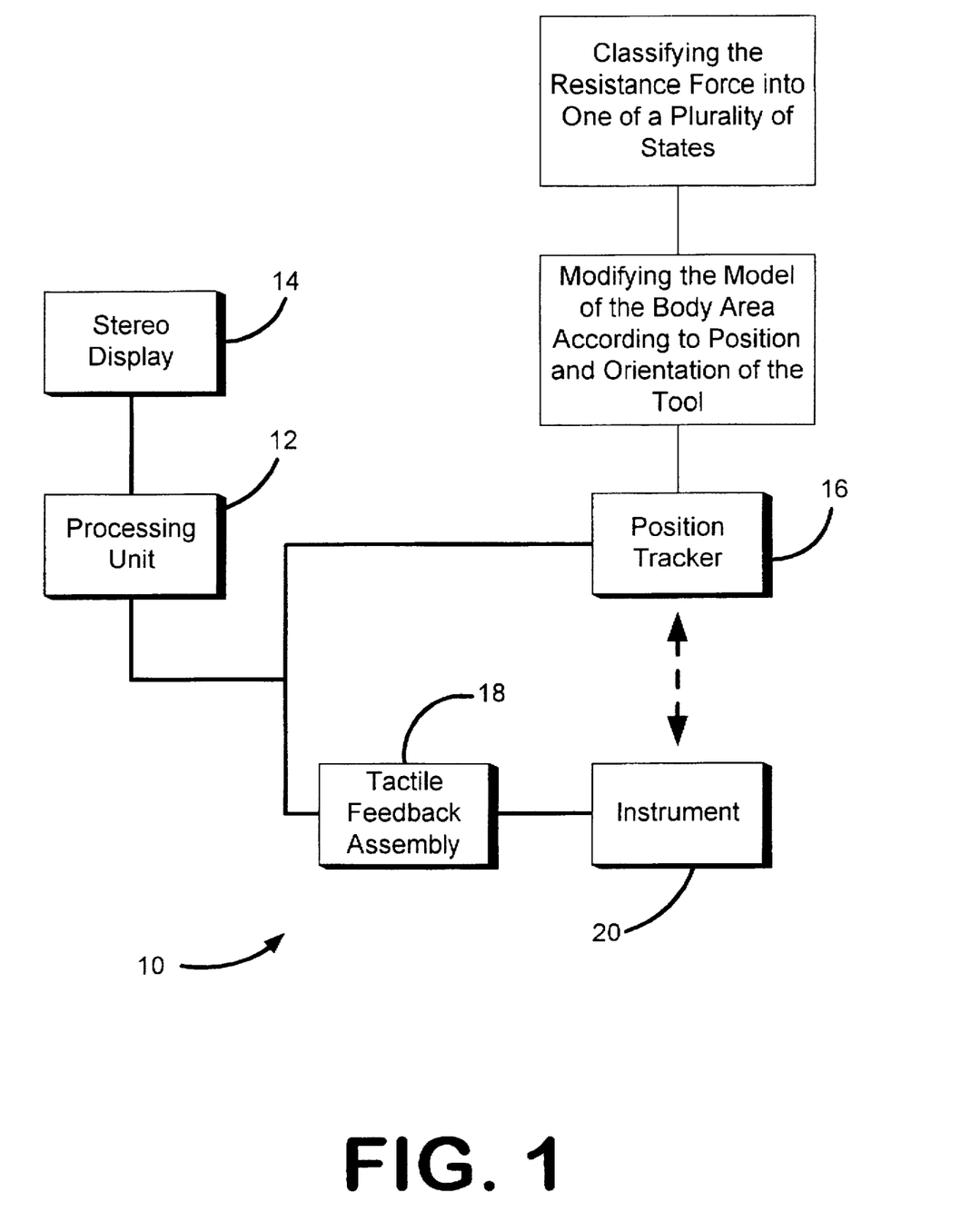
FIG. 1 is a block diagram of a preferred embodiment of the invention.

Reference will now be made in detail to the preferred embodiment of the invention, which is illustrated in the accompanying drawings. With reference to FIG. 1, a surgical simulator 10 according to an exemplary embodiment of the invention provides both visual and tactile feedback to an intern. For the purposes of this description, the person using the simulator 10 will be generally referred to as an intern but it should be understood that the benefits of the simulator 10 are not limited to only interns but has many applications to practicing physicians as well.

The simulator 10 generally comprises a processing unit 12, a display 14, a position tracker 16, a tactile feedback assembly 18, and an instrument 20. The display 14 is preferably a stereo display providing images of an eye to the intern. The intern holds the instrument 20, which simulates a surgical tool, and receives tactile feedback from the tactile feedback assembly 18 based upon the position of the instrument 20 as determined by the position tracker 16. The forces fed back to the instrument 20 from the tactile feedback assembly 18 are forces that would be felt during an actual surgical procedure. The eye displayed on the stereo display 14 is manipulated in response to the position of the virtual instrument 20 in a manner that an actual eye would be manipulated if the surgical tool were located in the eye at the position of the instrument 20.

Figure 2:
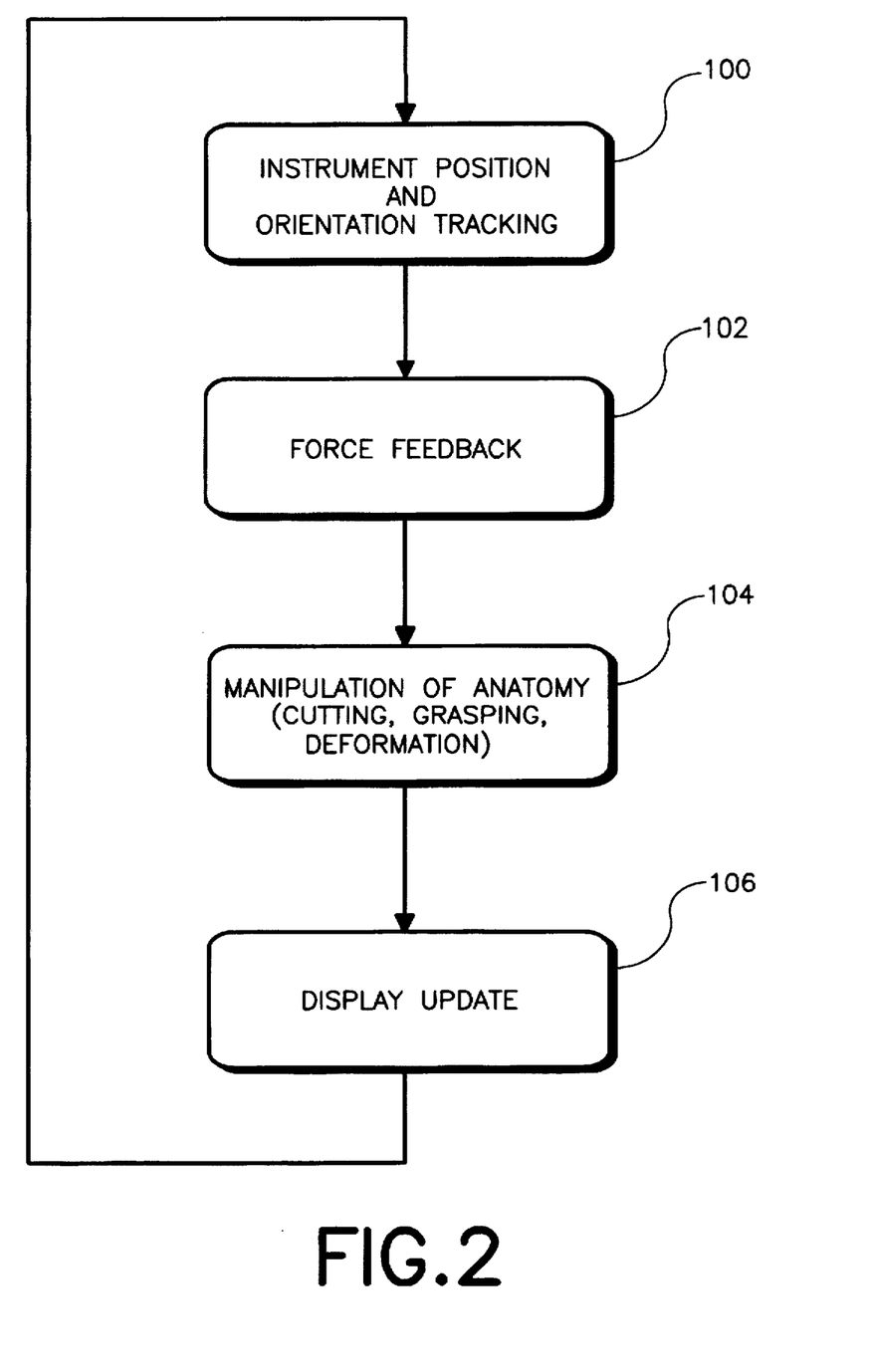
FIG. 2 is a flow chart for the operation of the invention.

With reference to a flow chart of operation as shown in FIG. 2, the processing unit 12 receives signal from a position tracker 16 and determines the position and orientation of the instrument 20 at a step 100. At a step 102, based upon the position and orientation of the instrument 20, the processing unit 12 indicates to the tactile feedback assembly 18 the type of force that should be felt through instrument 20 in order to realistically portray an actual surgical procedure. The processing unit 12 manipulates the eye based on the position and orientation of the instrument 20 at step 104 and updates the display 14 to reflect the eye in its manipulated form at step 106. The processing unit 12 then checks the next position and orientation of the instrument 20 at step 100 and cycles through the above-described process.

Figure 3:
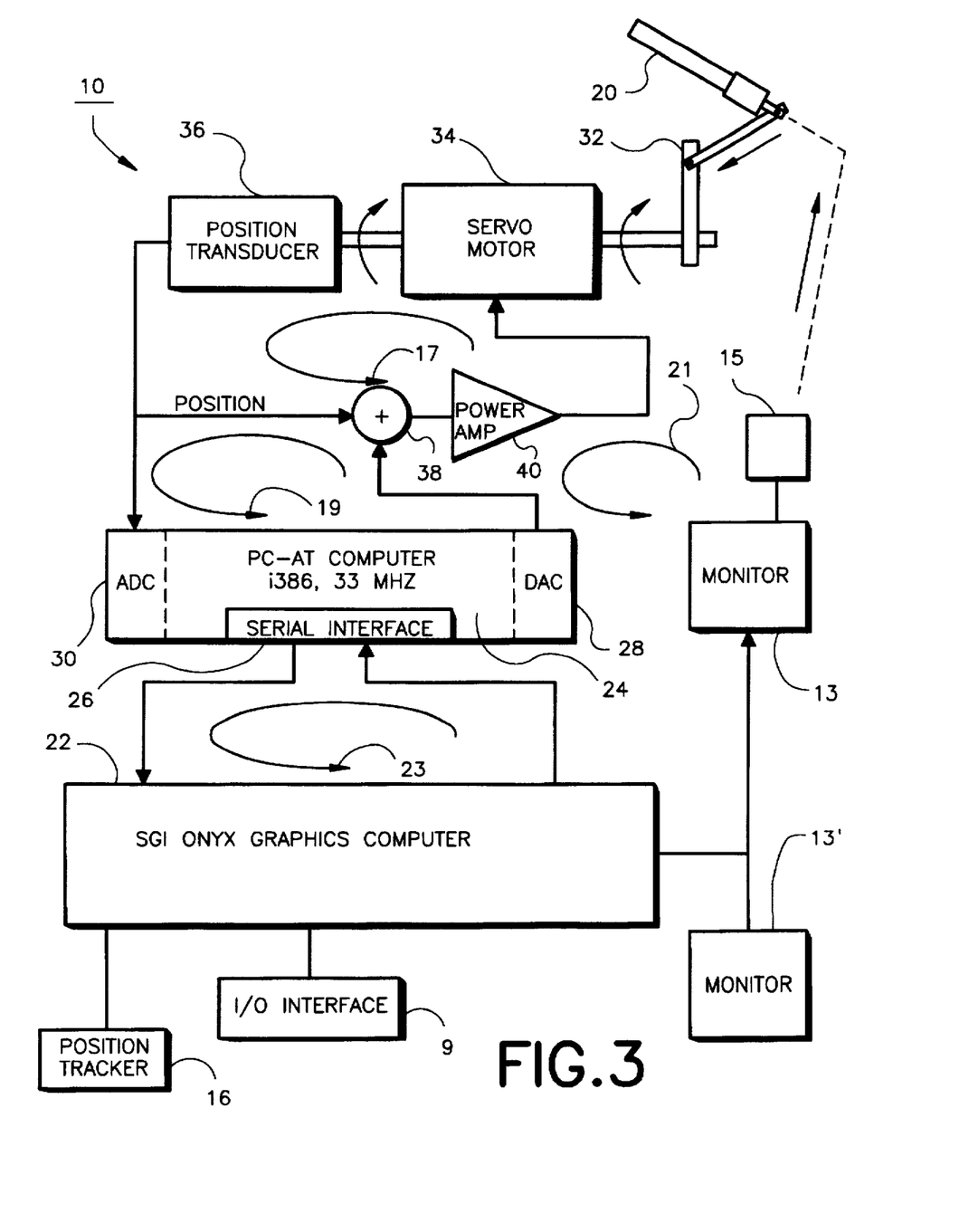
FIG. 3 is a more detailed block diagram of the invention of FIG. 1.

As shown in more detail in FIG. 3, the display 14 comprises a monitor 13 for displaying two images of an eye and optics 15 for combining the two images of the eye into a stereo image of the eye. The optics 15 is preferably designed to simulate an actual operating microscope and has appropriate optics for combining the two images from display into a stereo view of the eye. The optics 15 can therefore simulate any known type of operating microscope and can also be changed according to the procedure being performed or according to the personal preference of an intern. While only a single monitor 13 has been shown, the surgical simulator 10 may comprise additional monitors 131 for displaying the practice procedure to an instructor or to other interns. The ability to generate two images of an eye at slightly different perspectives and to combine the images into a stereo view of the eye is within the capability of one of ordinary skill in the art and will not be described in detail.

During a simulated procedure, the instrument 20 preferably simulates the weight, shape, and feel of an actual surgical instrument. For instance, the instrument 20 may comprise a stylus having a length, weight, and shape approximating a scalpel. The instrument 20 is connected through a ball joint to three sets of levers and hinges 32. Each set of levers and hinges is connected to a limited-angle servo-motor 34 which can provide a linear force to the instrument 20 along one of the x, y, or z axes. The linear forces from the servo-motors 34 are transmitted through the sets of levers and hinges 32 to the instrument 20 and together can generate a linear force along any direction The processing unit 12, for example, comprises an SGI Onyx graphics computer 22 and an auxiliary computer 24. Based upon the position and orientation of the instrument 20 as determined by the position tracker 16, which is preferably a Polhemus 6D Digitizer, the graphics computer 22 indicates the general state of the instrument 20 to the auxiliary computer's 24 serial interface 26. From the state of the instrument 20, the auxiliary computer 24 determines the type of resistive force that should be applied to the instrument 20. Based upon the surgical tool selected and the position and orientation of the instrument, the resistive force is classified into one of a plurality of different states.

According to the method of the present invention, the method comprises the steps of developing a model of a bodily area, displaying the model of the bodily area, and then determining a position and orientation of an instrument simulating a surgical tool. Based upon the position and orientation of the instrument, resistive forces are provided to the instrument to reflect forces that would be applied to the surgical tool if the surgical tool were located at the position and orientation of the instrument but in an actual bodily area. The model of the bodily area is modified according to the position and orientation of the instrument to reflect effects of the surgical tool on the actual bodily area. Based upon the surgical tool selected and the position and orientation of the instrument, the resistive force is classified into one of a plurality of different states. The method then repeats itself by returning to the step of displaying the model of the bodily area.

As an example, nine possible states of the instrument 20 for cataract surgery are shown below in Table 1. The possible states of the instrument 20 include a State 1 which occurs when the instrument 20 is outside the eye. A State 2 is defined to be when the instrument 20 is cutting on the surface of the eye and a State 3 is when the eye is being pierced by the instrument 20. State 4 occurs when the instrument 20 cuts the eye after the eye has been pierced and a State 5 occurs when the lens is being phaco-emulsified. A State 6 is defined to be when the instrument 20 is not a scalpel and the instrument does not enter the wound whereas a State 7 is when the instrument enters the wound. A State 8 occurs when the instrument 20 is a set of forceps pulling at tissue and a State 9 occurs when the instrument 20 is being retracted. The states of the instrument 20 are not limited to only those listed but may encompass additional states for other aspects of cataract surgery or for other surgical procedures.

TABLE 1

EYE-SURGERY SIMULATION TACTILE STATE CHART

| STATE | CONDITION | X (RADIAL) | Y (FORWARD/ BACKWARD) | Z (UP/ DOWN) |
|---|---|---|---|---|
| 1 | Outside Eye | NONE | NONE | NONE |
| 2 | Cutting on Surface | COMPLAINT | VISCOUS | COMPLAINT |
| 3 | Act of Piercing | NONE | PREVIOUS | PREVIOUS |
| 4 | Cutting after piercing | VISCOUS | VISCOUS | COMPLAINT |
| 5 | Phaco-ing Lens | VISCOUS | COMPLAINT | COMPLAINT |
| 6 | Not-scalpel Not entering wound | COMPLIANT | COMPLIANT | COMPLAINT |
| 7 | Entering wound | NONE | COMPLAINT | COMPLAINT |
| 8 | Forceps pulling tissue | COMPLAINT | COMPLIANT | COMPLIANT |
| 9 | Tool Retracting | NONE | PREVIOUS | PREVIOUS |

Figure 4:
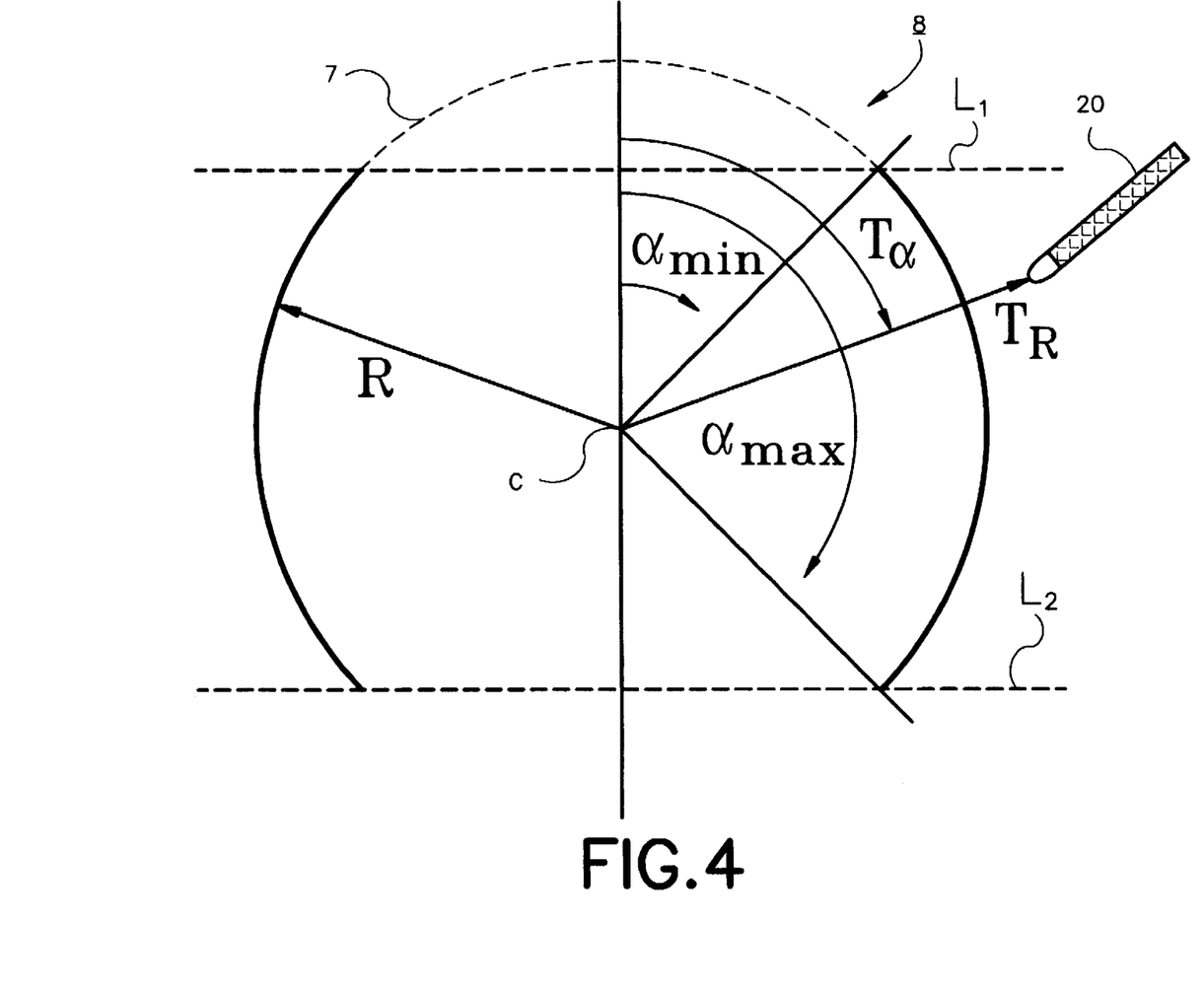
FIG. 4 is an example of an instrument in a State 1 relative to a model eye.
Figure 5:
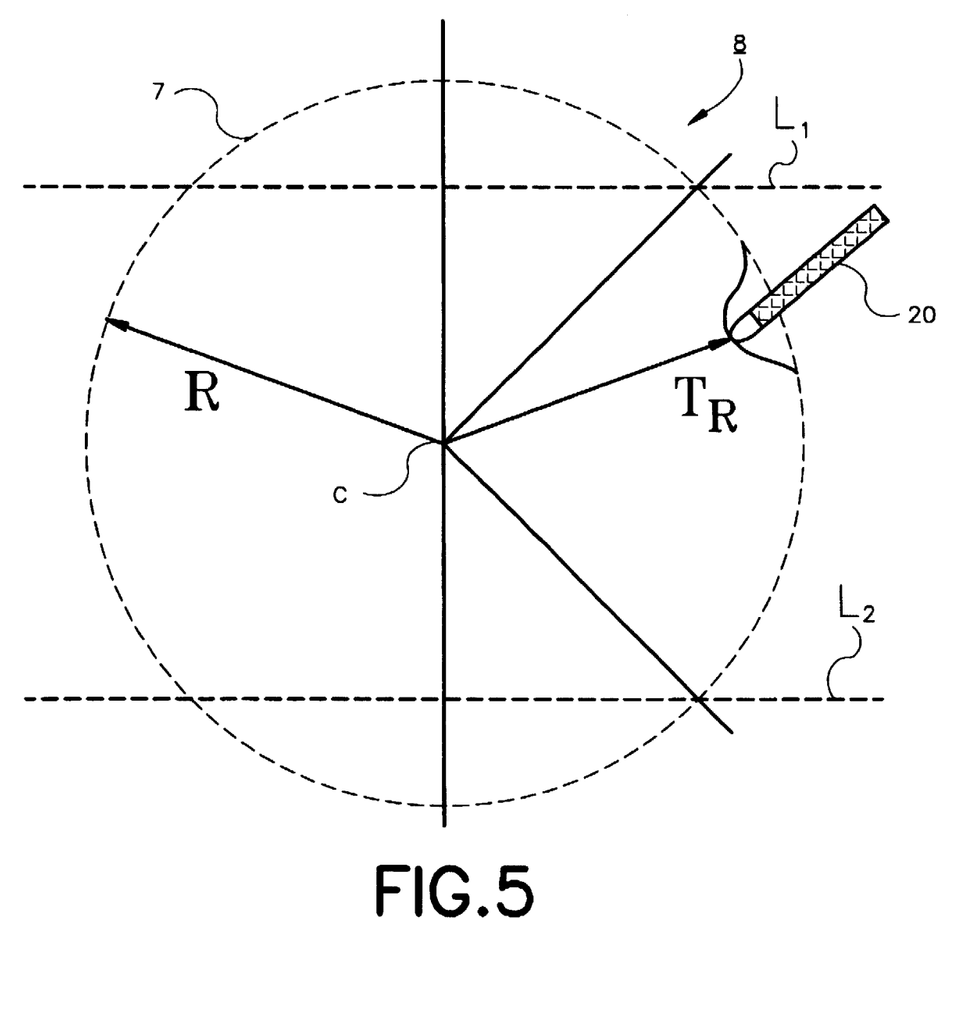
Fig. 5 is an example of an instrument in a State 3 relative to a model eye.
Figure 6:
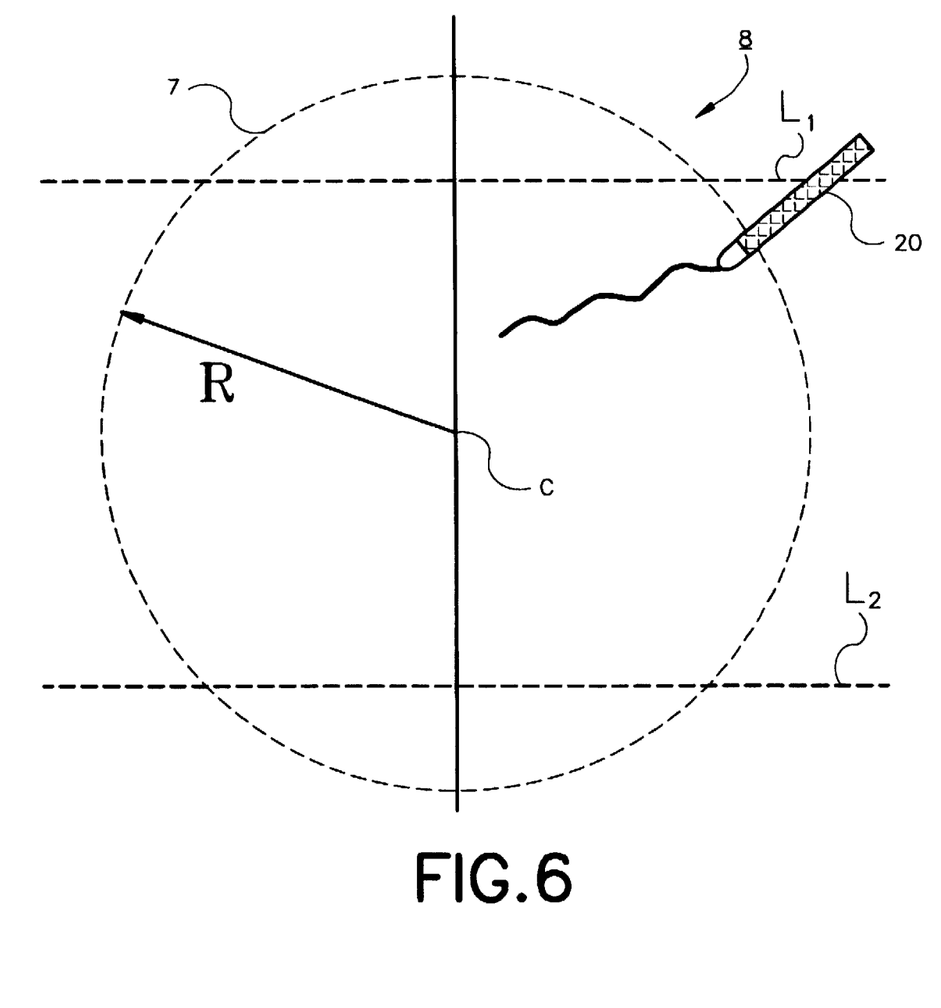
FIG. 6 is an example of an instrument in a State 4 relative to model eye.

FIGS. 4 to 6 provide examples as to how States 1; 3, are determined by the graphics computer 22. For instance, with reference to FIG. 4, the instrument 20 is in State 1 when the instrument 20 is located outside the eye in free space. With reference above to Table 1, as should be expected, the instrument 20 may be moved about in free space without receiving any type of resistive force.

In FIG. 4, a model of an eye 8 having a center point C and forming a generally spherical body 7 of radius R. A portion of the model eye 8 between dashed lines $L_1$ and $L_2$ corresponds to a portion of an eye that is typically exposed during surgery. The lines $L_1$ and $L_2$ intersect with the model eye 8 at angles of $\alpha_{min}$ and $\alpha_{max}$. The tip of the instrument 20 is at a distance $T_R$ from the center C of the eye 8 and the instrument 20 is at an angle of $T_\alpha$ relative to a horizontal plane. The graphics computer 22 determines that the instrument 20 is in free space unless both $T_R$ is less than or equal to R and $T_\alpha$ is between $\alpha_{min}$ and $\alpha_{max}$.

FIG. 5 depicts the instrument 20 in State 3 in which the instrument is piercing the surface of the eye 8. After $T_R$ becomes less than R, the instrument 20 does not initially pierce the eye 8 but instead first deforms the surface of the eye 8 in the shape of a modified gaussian distribution. While in State 3, the instrument 20 receives compliant resistive forces along the radial direction and viscous forces along tangential directions.

The instrument 20 will deform the surface of the eye until $T_R$ reaches a certain distance, which is preferably 0.05 inches. After the eye 8 has been pierced, the tissue in the eye 8 folds back about the instrument 20, as shown in FIG. 6. The instrument 20 is then in State 4 in which the instrument 20 is cutting after having pierced the eye 8.

With reference to Table 1, when the instrument 20 consists of a scalpel, the instrument 20 will receive viscous forces as the instrument 20 cuts through the eye 8 along a cutting surface of the scalpel and will receive a compliant force if the instrument 20 is moved up or down against the non-cutting faces of the scalpel. The forces received in the other states should be apparent to one of ordinary skill in the art and therefore will not be discussed in detail.

As shown in Table 1, the state of the instrument 20 indicates the type of resistive force that should be applied against the instrument 20. The auxiliary computer 24 controls the force applied against the instrument 20 according to the state of the instrument 20 and also based upon the position of the instrument 20. To determine the position of the instrument 20, each servo-motor 34 is provided with a position transducer 36 for relaying the position of the servo-motor 34 to an analog to digital converter 30 in the auxiliary computer 24. By monitoring the signals from the three position transducers 36, the auxiliary computer 24 determines the position of the instrument 20 and determines the amount of resistive force that should be fed back to the instrument 20.

Figure 7:
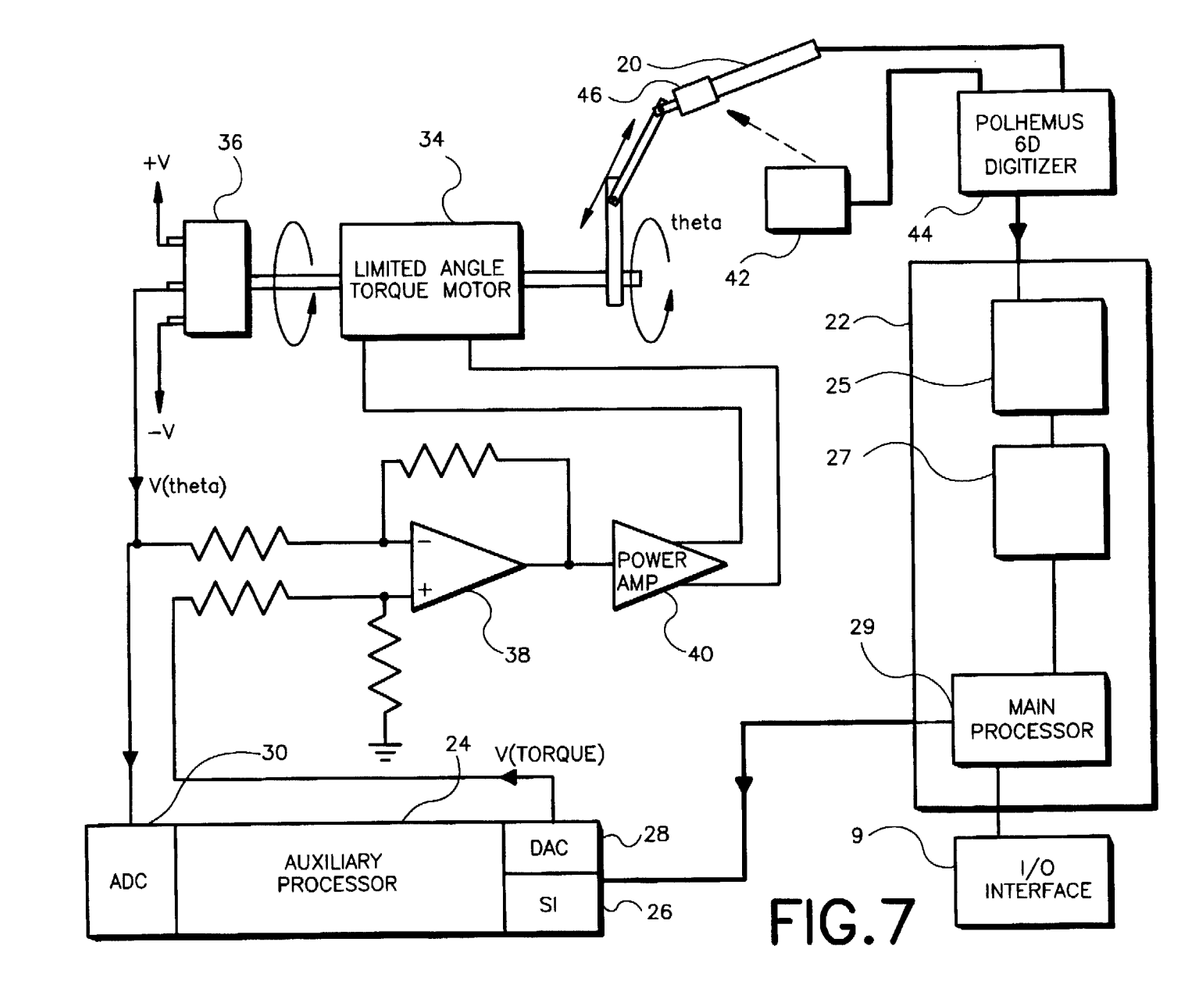
FIG. 7 is a schematic of the surgical simulator of FIG. 1.
Figure 8:
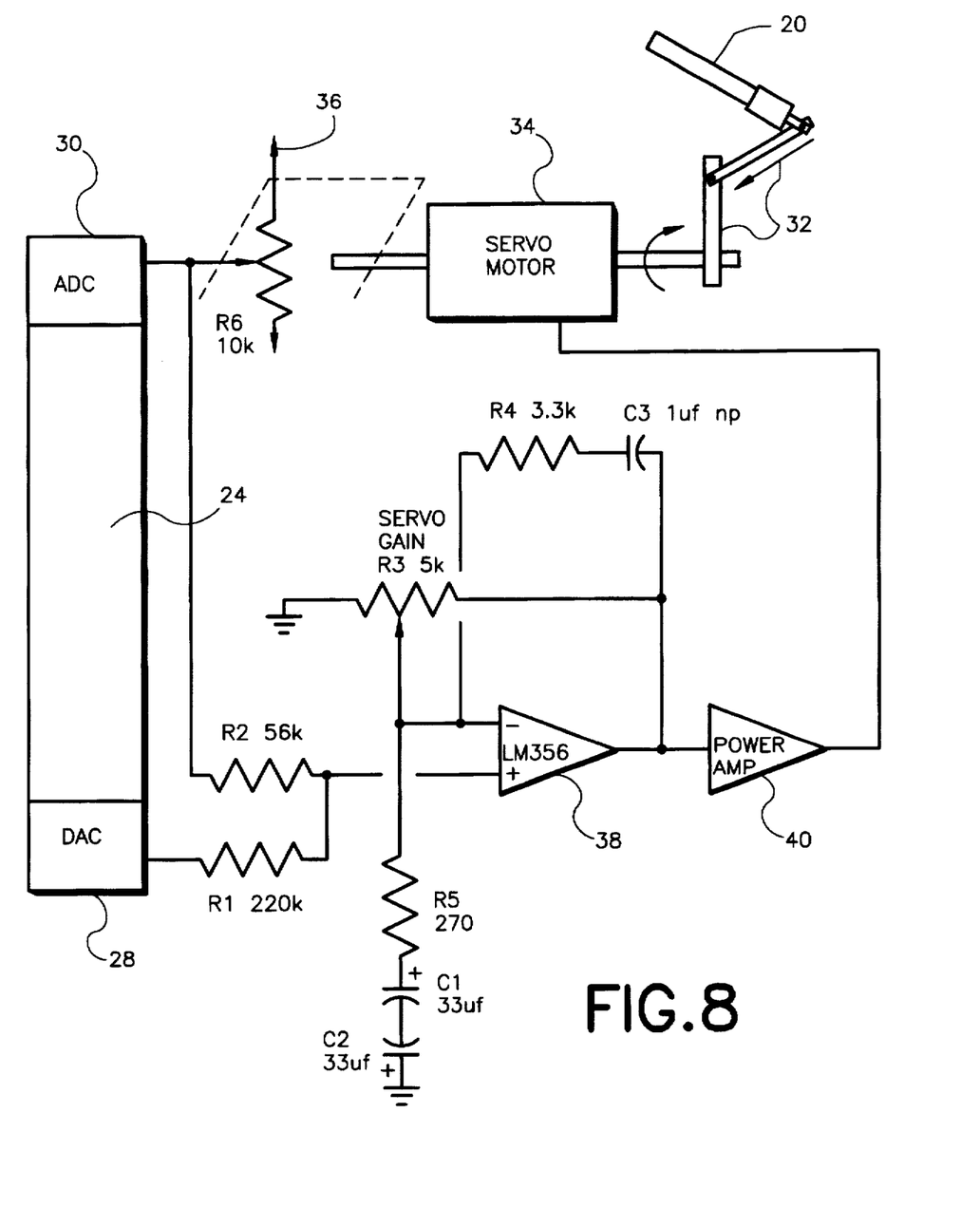
FIG. 8 is a schematic of the tactile feedback circuit for a single axis.

From the position of the servo-motor 34 and the state of the instrument 20, the auxiliary computer 24 supplies a signal from its digital to analog converter 28 to an adder 38 for controlling the amount of force supplied to the virtual instrument 20. The adder 38 combines the position signal from the position transducer 36 with the signal from the auxiliary computer 24 and supplies the resultant signal to a power amplifier 40. The resultant signal amplified by the power amplifier 40 then drives the servo-motor 34 to apply the specified amount of force to the virtual instrument 20 along one of the three axes. When the forces from each servo-motor 34 are combined, a resistive force can be generated in any directions In a preferred embodiment, as shown in FIGS. 7 and 8, the servo-motor 34 comprises a limited angle torque-motor 34 and the position transducer 36 comprises an analog rotational encoder 36. The signal from the digital to analog converter 28 passes through a resistor R1 to the non-inverting input of op-amp 38. The non-inverting input of op-amp 38 also receives the position signal from the analog rotational encoder 36 after passing through resistor R2. The auxiliary computer 24, for example, comprises a personal computer having a i386, 33 MHz processor.

To provide realistic tactile feedback, the auxiliary computer 24 models the tactile feedback with feedback measured during an actual procedure. The actual feedback during a procedure, for example, may be measured by mounting a pressure transducer to a surgical instrument through a string. A surgeon would then move the instrument, which would also move the pressure transducer, through a portion of an eye. The pressure transducer would be mechanically attached to a position transducer which monitors the position of the instrument in the eye. With such an arrangement, the pressure and the cutting texture could be determined at various locations within an eye and for different surgical instruments. Other arrangements for obtaining measurements of the eye will be apparent to those of ordinary skill in the art.

Figure 9:
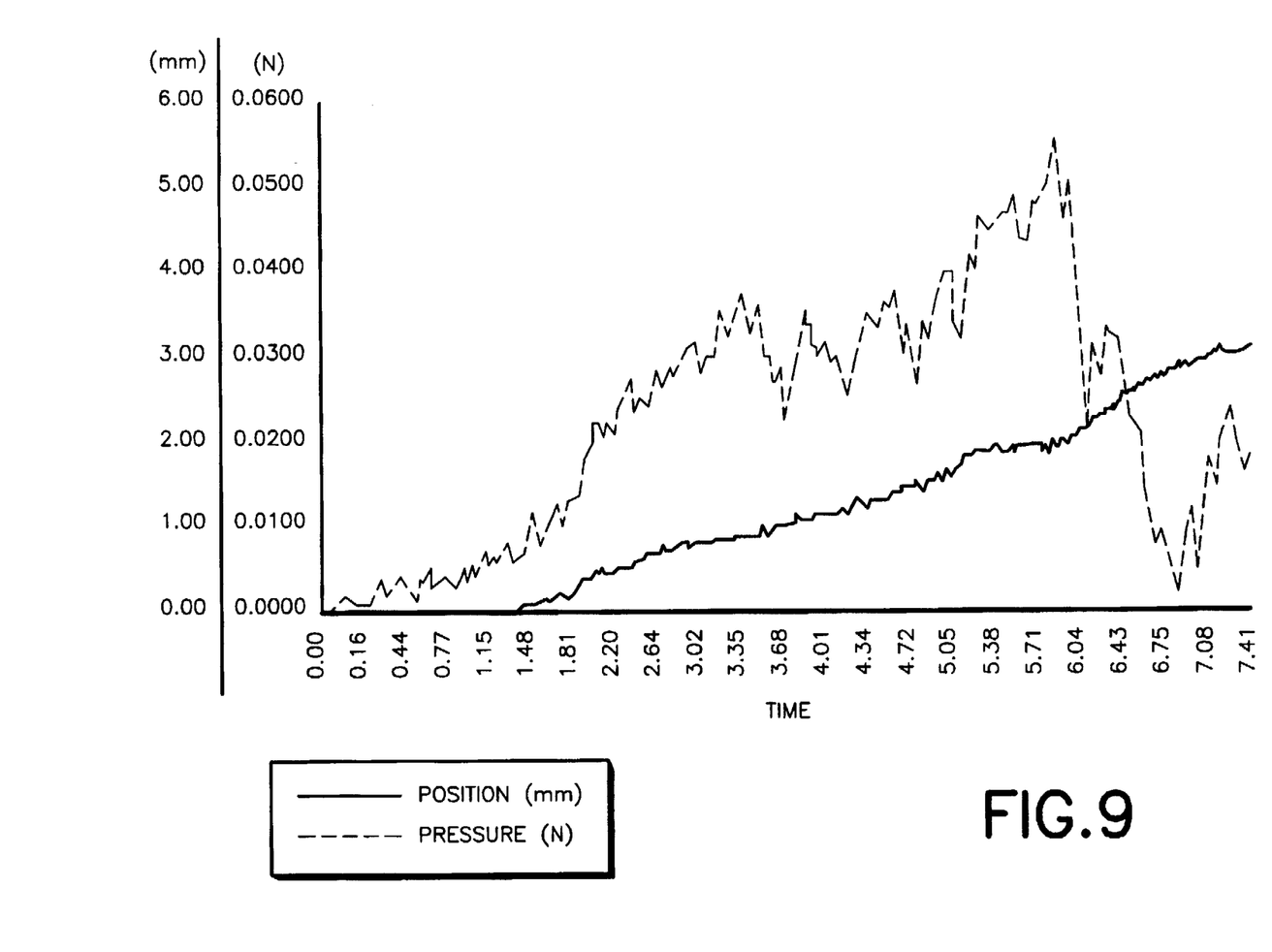
FIG. 9 is an exemplary force versus distance plot to be applied to the instrument through the tactile feedback assembly

An example of a force versus distance graph for a scalpel cutting through sclera tissue is shown in FIG. 9. As shown in the figure, the pressure applied to the scalpel varies quite considerably as the scalpel is being moved through the sclera, which is indicative of the non-homogeneity of the tissue during the cutting action. From this graph, the auxiliary computer 24 determines the amount of force that should be applied to the instrument 20 based upon the position of the instrument 20. The forces applied to a scalpel moving through other tissues and the forces applied to other surgical instruments are determined in a similar manner. The data from all of the graphs are loaded into the auxiliary computer 24 for appropriately controlling the forces applied to the instrument 20.

In order to realistically portray a visual image of an eye, photographs were taken of the sclera, iris, zonules, and retina from an actual eye. These photographs were then texture mapped on geometric surfaces and a deformable three dimensional mathematical model of the eye was developed from the geometric surfaces. The lens and cornea are displayed as being semi-transparent and the eye is illuminated from a light source coincident with the intern's field of view.

The manipulation of the eye is performed with the main processor 29 in the graphics computer 22. For a cutting operation, an incision caused by the instrument 20 is monitored by tracking the tip of the instrument 20. A redline is drawn along this path to simulate an actual incision. For a grasping operation, the surface of the eye is recomputed based on a modified gaussian deformation curve. This modified gaussian deformation curve is the same type of curve used to illustrate a depression along the surface of the eye when the instrument 20 is piercing the surface. For a phaco-emulsifier, the lens and the sclera are both deformed as the phaco-emulsifier is moved beneath the lens. Furthermore, after the phaco-emulsifier is activated, the lens is collapsed and the instrument 20 receives vibrations to simulate the removal of the cataract. The effects of other instruments 20 on the tissues of the eye will be apparent to those skilled in the art.

The position tracker preferably comprises a Polhemus 6D digitizer 44 and a transceiver 42. The instrument 20 has three coils mounted along three orthogonal directions with each of the coils being separately interrogated by the transceiver 42. Based upon the phasing and timing of the signals transmitted from the coils on the instrument 20 and received at the transceiver 42, the Polhemus 6D digitizer 44 determines the position of the virtual instrument 20 in three dimensional space as well as the roll, pitch, and yaw of the instrument 20.

Because the position of the coils 46 on the instrument 20 is fixed, the Polhemus 6D digitizer 44 determines the precise location of every part of the instrument 20, including the tip of the instrument 20.

The Polhemus-6D digitizer 44 determines the position and orientation of the instrument 20 at a rate of 50 times per second. The position and orientation data from the Polhemus-6D digitizer 44 is transferred into a shared memory 27 in the graphics computer 22 under the control of a memory manager 25. A main processor 29 in the graphics computer 29 reads the most current position and orientation data from the shared memory 27 and determines the state of the instrument 20. The state of the instrument 20 is then transferred from the main processor 29 to the auxiliary computer 24.

The graphics computer 22 is preferably connected to an Input/Output Interface 9. The Input/Output Interface 9 has a plurality of buttons and dials for controlling the simulation procedure. For instance, the Input/Output Interface 9 has a set of buttons for selecting the type of instrument 20 that will be used in the procedure. The instrument 20 could therefore comprise a scalpel, intraocular forceps, bipolar coaxial diathermy, a phako-emulsifier, a cryo-probe, a vitreous cutter, or a visco-elastic injector. While a single instrument 20 may simulate all of these types of surgical tools, the instrument 20 is preferably replaced with an instrument that more closely resembles the weight, shape, and functioning of the actual surgical tool.

The Input/Output Interface 9 has a button for resetting the procedure and also a button for calibrating the surgical simulator 10. The surgical simulator 10 must be calibrated so that the center of the eye displayed through the optics 15 coincides with the center of the eye in the tactile feedback assembly 18. Although the surgical simulator 10 preferably performs this calibration at the beginning of each procedure, the Input/Output Interface 9 may have the calibration button so that the calibration may be performed more frequently.

The Input/Output Interface 9 could also have a set of buttons for varying the characteristics of a particular tool. For instance, the sharpness of a scalpel could be varied to simulate the dulling of the blade over time. By varying the sharpness of the scalpel or other characteristic of an instrument, an intern or physician could practice a procedure that will be performed in an area where supplies are limited.

The Input/Output Interface 9 has a set of buttons for controlling the recording and playing back of a practice procedure. By virtue of the graphics computer 22, a dial on the Input/Output Interface 9 can be rotated to adjust the angle of view during the replay of the procedure. Thus, the procedure may be viewed from the intern's field of view, from directly behind the eye, or for any other angle of view. Further, the Input/Output Interface 9 has a dial for performing a zoom function. With the zoom dial, a particular area of the eye can be magnified or reduced to view the effects of the instrument 20 on the eye. Moreover, the procedure can be replayed with the eye displayed in a sectional view or with layers of the eye removed. Consequently, the replay of the procedure provides an intern with valuable information as to the exact location of the tip of the instrument 20 relative to the various components of the eye during every moment of the procedure In addition to learning how to perform cataract surgery, an intern may learn how to perform a secondary lens implantation, a radial keratotomy, or may learn how to suture a corneal sclera laceration. The selection of these different procedures would be accomplished through the Input/Output Interface 9 It would also be possible to modify a certain procedure to have one or more complications. For instance, during cataract surgery, the intern may be presented with an expulsive hemorrhage or a lens posterior capsule rupture.

It would also be possible with the surgical simulator 10 to portray a certain type of patient type. A dial on the Input/Output Interface 9 selects the transparency of the cornea. Since the cornea becomes less transparent with age, the surgical simulator 10 can alter the model of the eye to correspond with a certain age group of patients. Furthermore, the force versus distance plots for a certain person would likely vary according to the climate or diet of the person. The force versus distance plots could therefore be modeled to a specific geographic region or to a specific diet in order to train an intern or physician for practice in that region While the invention has been described with reference to surgery on a human, the surgical simulator 10 could also be used in veterinary medicine. As with a human eye, photographs of an animal's eye would be taken to produce an image of the eye and force versus distance plots would be generated to simulate the tactile feel of the eye.

Because the surgical simulator 10 can realistically portray the look and feel of an actual surgical procedure and can objectively document the performance of an intern or physician, it would be possible to use the surgical simulator 10 to certify a physician for a particular procedure. A physician's score could be based on such factors as the depth and angle of an incision, the location of the incision, the damage to the eye, as well as various other factors. The surgical simulator 10 would eliminate the rather subjective evaluation of an intern given by a supervising surgeon.

The surgical simulator 10 could be connected to another processor or even to a network of other processors. The graphics computer 22 might be directly connected to the other processors or may be connected to the processors through a modem. When the surgical simulator 10 is connected to another processor, it would be possible to demonstrate a procedure to a remote location and receive recommendations from another physician at the remote location as to the optimal manner of performing the procedure.

A network of surgical simulators 10 would also be beneficial in the academic setting. For instance, a professor could demonstrate a procedure at one location and students at more than one college could watch the procedure and replay the procedure at their convenience. After practicing on the surgical simulator 10, the students could be tested on the surgical simulator 10 and the results of the test could be transmitted back to the professor for grading purposes.

The foregoing description of the preferred embodiment of the invention has been presented for purposes of illustrating the features and principles thereof. It is not intended to be exhaustive or to limit the invention to the precise form disclosed. Many modifications and variations are possible in light of the above teaching.

The embodiment was chosen and described in order to explain the principles of the invention and its practical application; various other possible embodiments with various modifications as are suited to the particular use are also contemplated and fall within the scope of the present invention.

We claim:

1. An apparatus for simulating a surgical procedure, comprising:

means for displaying a stereo image of a body area;

an instrument for simulating a surgical tool;

means for tracking the position and orientation of said instrument and for generating positional signals;

tactile feedback means for providing resistive forces to said instrument based upon a tactile command signal and based upon said position and orientation of said instrument; and processing means for receiving said positional signals, for producing a manipulated body area based upon said positional signals, for transmitting a stereo image of said manipulated body area to said displaying means, and for generating said tactile command signal to said tactile feedback means;

wherein said tracking means comprises:

a set of three coils attached to said instrument and arranged in orthogonal directions to each other;

a transceiver separately interrogating each of said three coils and receiving return signals from said three coils; and means, connected to said transceiver, for determining said position and orientation of said instrument from said return signals.

2. The apparatus as set forth in claim 1, wherein said processing means comprises a graphics computer generating a three dimensional mathematical model of said body area.

3. The apparatus as set forth in claim 1, wherein said tactile command signal generated by said processing means indicates a type of said resistive force applied to said instrument.

4. The apparatus as set forth in claim 1, wherein said displaying means comprises a monitor for displaying two images of an eye and optics for combining said two images of said eye into a stereo image of an eye.

5. The apparatus as set forth in claim 1, further comprising means for recording said procedure and means for replaying said procedure from any angle of view.

6. The apparatus as set forth in claim 1, further comprising an input/output interface for assigning said instrument to any one of a plurality of surgical tools.

7. The apparatus as set forth in claim 1, further comprising an input/output interface for varying aspects of said body area.

8. An apparatus for simulating a surgical procedure, comprising:

means for displaying a stereo image of a body area;

an instrument for simulating a surgical tool;

means for tracking the position and orientation of said instrument and for generating positional signals;

tactile feedback means for providing resistive forces to said instrument based upon a tactile command signal and based upon said position and orientation of said instrument; and processing means for receiving said positional signals, for producing a manipulated body area based upon said positional signals, for transmitting a stereo image of said manipulated body area to said displaying means, and for generating said tactile command signal to said tactile feedback means;

wherein said tactile feedback means comprises:

three servo-motors for providing resistive forces along three orthogonal axes with each servo-motor connected to said instrument through a respective set of levers;

three encoders connected to said three servo-motors, respectively, for generating first, second, and third servo-motor position signals, respectively; and a microprocessor controlling said three servo-motors based upon said first, second, and third servo-motor position signals and based upon said tactile command signal from said processing means.

9. A surgical simulator for simulating eye surgery, comprising:

a display for providing stereo images of a model eye;

an instrument for simulating a surgical tool;

a position and orientation tracker for supplying positional signals to a first processor to indicate a position and orientation of said instrument;

said first processor generating said model eye, receiving said positional signals, modifying said model eve according to said position and orientation of said instrument, driving said display to provide said stereo image of said model eye, and generating a tactile command signal;

a second processor for controlling an amount and direction of a resistive force applied to said instrument, said second processor varying said resistive force according to said tactile command signal and said position and orientation of said instrument;

wherein said model eye is modified to approximate a modification of an actual eye when said surgical tool is located at said position and orientation within said actual eye and said resistive forces approximate forces supplied to said surgical tool when said surgical tool is at said position and orientation within said actual eye;

said simulator further comprising:

three servo-motors for providing said resistive forces along three orthogonal axes with each servo-motor connected to said instrument through a respective set of levers;

three encoders connected to said three servo-motors, respectively, for generating first, second, and third servo-motor position signals, respectively;

wherein said second processor determines said position and orientation of said instrument from said first, second, and third servo-motor position signals.

10. The surgical simulator as set forth in claim 9, further comprising means for recording said surgery and means for replaying said surgery with said model eye being displayed from any angle of view.

11. The apparatus as set forth in claim 9, further comprising an input/output interface for assigning said instrument to any one of a plurality of surgical tools.

12. The apparatus as set forth in claim 9, further comprising an input/output interface for varying aspects of said model eye.

13. A surgical simulator for simulating eye surgery, comprising:

a display for providing stereo images of a model eye;

an instrument for simulating a surgical tool;

a position and orientation tracker for supplying positional signals to a first processor to indicate a position and orientation of said instrument;

said first processor generating said model eye, receiving said positional signals, modifying said model eye according to said position and orientation of said instrument, driving said display to provide said stereo image of said model eye, and generating a tactile command signal;

a second processor for controlling an amount and direction of a resistive force applied to said instrument, said second processor varying said resistive force according to said tactile command signal and said position and orientation of said instrument;

wherein said model eye is modified to approximate a modification of an actual eye when said surgical tool is located at said position and orientation within said actual eye and said resistive forces approximate forces supplied to said surgical tool when said surgical tool is at said position and orientation within said actual eye; and wherein said position and orientation tracker comprises:
  a set of three coils attached to said instrument and arranged in orthogonal directions to each other;
  a transceiver separately interrogating each of said three coils and receiving return signals from said three coils; and
  means, connected to said transceiver, for determining said position and orientation of said instrument from said return signals.

14. A method for simulating a surgical procedure comprising the steps of:
  providing an apparatus having:
    means for displaying a stereo image of a body area;
    an instrument for simulating a surgical tool;
    means for tracking the position and orientation of said instrument and for generating positional signals;
    tactile feedback means for providing resistive forces to said instrument based upon a tactile command signal and based upon said position and orientation of said instrument; and
    processing means for receiving said positional signals, for producing a manipulated body area based upon said positional signals, for transmitting a stereo image of said manipulated body area to said displaying means, and for generating said tactile command signal to said tactile feedback means;
  wherein said tactile feedback means comprises:
    three servo-motors for providing resistive forces along three orthogonal axes with each servo-motor connected to said instrument through a respective set of levers;
    three encoders connected to said three servo-motors, respectively, for generating first, second, and third servo-motor position signals, respectively; and
    a microprocessor controlling said three servo-motors based upon said first, second, and third servo-motor position signals and based upon said tactile command signal from said processing means; and
  displaying a model of said body area;
  determining a position and orientation of said instrument, said instrument simulating a surgical tool;
  providing resistive forces to said instrument based upon said position and orientation of said instrument to reflect forces applied to said surgical tool at said position and orientation in an actual body area; and
  returning to said step of displaying said model in order to display said model of said body area after being modified.

15. The method as set forth in claim 14, wherein said step of developing said body area comprises the step of developing a model of an eye.

16. The method as set forth in claim 14, further comprising the step of assigning said instrument to one out of a plurality of possible surgical tools.

17. The method as set forth in claim 14, further comprising the steps of recording said surgical procedure being simulated and replaying said surgical procedure.

18. The method as set forth in claim 14, wherein said step of displaying said model of said body area comprises the step of varying an angle at which said body area is displayed to any angle of view.

19. The method as set forth in claim 14, wherein said step of displaying said model of said body area comprises the step of displaying a stereo view of said model of said body area.

20. The method as set forth in claim 14, further comprising the step of classifying said resistive force into one of a plurality of states according to said position and orientation of said instrument and based upon said surgical tool.

21. A method for simulating a surgical procedure comprising the steps of
  providing an apparatus having:
    a display for providing stereo images of a model eye;
    an instrument for simulating a surgical tool;
    a position and orientation tracker for supplying positional signals to a first processor to indicate a position and orientation of said instrument;
    said first processor generating said model eye, receiving said positional signals, modifying said model eye according to said position and orientation of said instrument, driving said display to provide said stereo image of said model eye, and generating a tactile command signal;
    a second processor for controlling an amount and direction of a resistive force applied to said instrument, said second processor varying said resistive force according to said tactile command signal and said position and orientation of said instrument;
  wherein said model eye is modified to approximate a modification of an actual eye when said surgical tool is located at said position and orientation within said actual eye and said resistive forces approximate forces supplied to said surgical tool when said surgical tool is at said position and orientation within said actual eye;
  said simulator further comprising:
    three servo-motors for providing said resistive forces along three orthogonal axes with each servo-motor connected to said instrument through a respective set of levers;
    three encoders connected to said three servo-motors, respectively, for generating first, second, and third servo-motor position signals, respectively;
  wherein said second processor determines said position and orientation of said instrument from said first, second, and third servo-motor position signals; and
  displaying a model of said body area;
  determining a position and orientation of said instrument, said instrument simulating a surgical tool;
  providing resistive forces to said instrument based upon said position and orientation of said instrument to reflect forces applied to said surgical tool at said position and orientation in an actual body area; and
  modifying said model of said body area according to said position and orientation of said instrument to reflect effects of said surgical tool at said position and orientation in an actual body area; and
  returning to said step of displaying said model in order to display said model of said body area after being modified.

22. The method as set forth in claim 21, wherein said step of displaying a model of said body area comprises the step of developing a model of an eye.

23. The method as set forth in claim 21, further comprising the step of assigning said instrument to one out of a plurality of possible surgical tools.

24. The method as set forth in claim 21, further comprising the steps of recording said surgical procedure being simulated and replaying said surgical procedure.

25. The method as set forth in claim 21, wherein said step of displaying said model of said body area comprises the step of varying an angle at which said body area is displayed to any angle of view.

26. The method as set forth in claim 21, wherein said step of displaying said model of said body area comprises the step of displaying a stereo view of said model of said body area.

27. The method as set forth in claim 21, further comprising the step of classifying said resistive force into one of a plurality of states according to said position and orientation of said instrument and based upon said surgical tool.

* * * * *